C. W. TILLMAN.
REEL MOUNT.
APPLICATION FILED MAR. 1, 1920.
1,339,238.
Patented May 4, 1920.
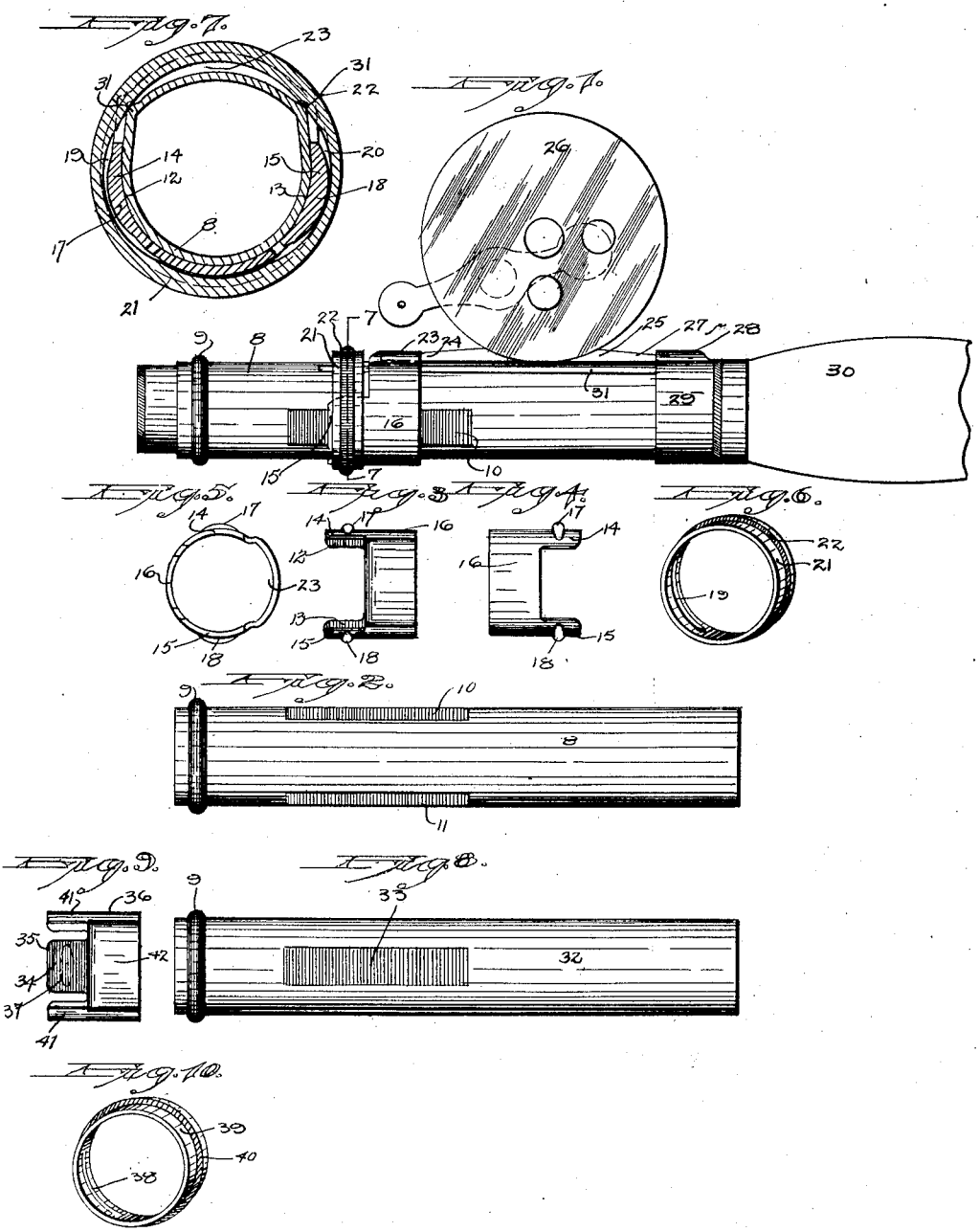

UNITED STATES PATENT OFFICE.

CLARENCE W. TILLMAN, OF NEW HAVEN, CONNECTICUT, ASSIGNOR TO WINCHESTER REPEATING ARMS CO., OF NEW HAVEN, CONNECTICUT, A CORPORATION.

REEL-MOUNT.

1,339,238. Specification of Letters Patent. Patented May 4, 1920.

Application filed March 1, 1920. Serial No. 362,262.

*To all whom it may concern:*

Be it known that I, CLARENCE W. TILLMAN, a citizen of the United States, residing at New Haven, in the county of New Haven and State of Connecticut, have invented a new and useful Improvement in Reel-Mounts; and I do hereby declare the following, when taken in connection with the accompanying drawings and the characters of reference marked thereon, to be a full, clear, and exact description of the same, and which said drawings constitute part of this application, and represent, in—

Figure 1, a broken view in side elevation of a reel-mount embodying my invention and mounting a reel.

Fig. 2, a detached plan view of the reel-seat tube.

Fig. 3, a detached plan view of the clamping-collar thereof.

Fig. 4, a reverse plan view thereof.

Fig. 5, a detached end view thereof.

Fig. 6, a detached perspective view of the cam-ring.

Fig. 7, an enlarged view in transverse section on the line 7—7 of Fig. 1.

Fig. 8, a detached reverse plan view of one of the modified forms which the reel-seat tube may assume.

Fig. 9, a detached plan view of the clamping-collar thereof.

Fig. 10, a detached perspective view of the cam-ring thereof.

My invention relates to an improved reel-mount for fishing-rods, the object being to provide a simple, convenient, and efficient device constructed with particular reference to positively locking the reel in place.

With these ends in view, my invention consists in a positively locking reel-mount having certain details of construction as will be hereinafter described and pointed out in the claims.

In carrying out my invention, as herein shown, I employ a reel-seat tube 8 having the usual bead 9 at its front end, and provided forward of its center and upon its right and left sides with corresponding bands or areas 10 and 11 of transverse corrugations produced by rolling, engraving, or in any other convenient manner.

The corrugated bands 10 and 11 are respectively engaged by and interlocked with corresponding sets of corrugations 12 and 13 located upon the inner faces of forwardly projecting laterally arranged spring arms 14 and 15 made integral with a clamping-collar 16 embracing the reel-seat tube 8 and adapted in size to be freely moved back and forth as well as rotated thereupon.

The outer faces of the said arms 14 and 15 are formed with transversely arranged cam-ribs 17 and 18 concentric with the collar 16 and respectively fitting into and co-acting with cam-grooves 19 and 20 struck outwardly from the inner face of a cam-ring 21 embracing the said arms and formed with a circumferential knurled bead 22 by means of which it is rotated for the co-action of its cam-grooves 19 and 20 with the cam-ribs 17 and 18, whereby the spring arms 14 and 15 are crowded laterally inward for being positively locked into the transverse corrugations of the areas 10 and 11, and also for its reverse rotation, whereby the cam-ribs 17 and 18 are brought into full registration with the grooves 19 and 20 and the arms 14 and 15 thus allowed to spring away from the corrugated areas 10 and 11 for permitting the collar 16 to be moved forward and back upon the forward end of the reel-seat tube 8.

The clamping-collar 16 has its upper portion offset to form a shallow segmental socket 23 for the reception of the forward end 24 of the reel-plate 25 of a reel 26 of any approved construction, the rear end 27 of the reel-plate being inserted into a similar socket 28 formed in the upper face of a fixed collar 29 of any approved construction and located just in front of the hand-hold or grip 30 of the fishing rod. The reel-seat tube 8 is formed upon its upper face with the customary parallel ribs 31 between which the reel-plate 25 is seated and by which it is held against lateral displacement upon the tube 8.

In the modified construction shown in Figs. 8 to 10 inclusive, the reel-seat tube 32 is formed upon its under face with a longitudinally arranged band or area 33 of transverse corrugations co-acting with corresponding corrugations 34 formed upon the inner face of a spring arm 35 projecting forwardly from the lower edge of a clamping-collar 36 adapted to be mounted upon the tube 32 and to be slid back and forth and rotated upon the forward portion thereof. The spring arm 35 is formed upon its outer face with a transversely arranged concentric cam-rib 37 co-acting with a a cam-groove 38 struck outward from the inner face of a cam-ring 39 having a knurled peripheral band 40, the said ring being adapted to be mounted upon the forward end of the collar 36 so as to embrace the spring arm 35 and also two integral forwardly projecting bearing-arms 41 flanking the same and in effect assisting the arm 35 to carry the cam-ring 39. The upper face of the collar 36 is struck up to form a shallow segmental socket 42 for the reception of the forward end 24 of a reel-plate 25. The use and operation of the modified construction just described is the same as for the construction shown in Figs. 1 to 7 inclusive.

I claim:

1. In a reel-mount, the combination with a reel-seat tube, of a sliding clamping-collar mounted thereupon and adapted to be engaged by the plate of a reel, and a cam-ring encircling the said tube and clamping-collar and rotatable thereupon for causing the collar to positively grip the tube, the corresponding surfaces of the collar and tube being roughened for that purpose.

2. In a reel-mount, the combination with a reel-seat tube, of a sliding clamping-collar mounted thereupon, the said tube and collar being provided with corresponding corrugated areas, and means applied to the collar for interlocking such areas for positively locking the collar upon the tube.

3. In a reel-mount, the combination with a reel-seat tube having one or more corrugated or roughened areas, of a clamping-collar slidably mounted thereupon and provided with one or more forwardly extending spring arms having their inner faces roughened; and a cam-ring encircling the tube and collar and rotatable thereon and adapted to co-act with the said arm or arms to force the corrugated faces thereof into positive locking engagement with the corresponding roughened surfaces of the tube.

4. In a reel-mount, the combination with a reel-seat tube having its opposite right and left hand faces formed with corrugated areas, of a clamping-collar slidably mounted upon the said tube over the said areas and formed with a pair of forwardly projecting laterally arranged spring arms having their inner faces corrugated and their outer faces provided with cam-ribs; and a cam-ring encircling the said tube and the forward end of the said collar and formed with cam-slots for co-acting with the cam-ribs of the said arms to force the same into positive engagement with the corrugated areas of the tube for positively locking the collar thereupon.

In testimony whereof I have signed this specification in the presence of two subscribing witnesses.

CLARENCE W. TILLMAN.

Witnesses:
DANIEL H. VEADER,
ERIK S. PALMER.